May 10, 1966 J. W. HENRY 3,250,173
ABRASION RESISTENT LENTICULAR ELEMENT INTEGRAL WITH AN
IMAGE ON A PAPER BASE
Filed Oct. 23, 1962
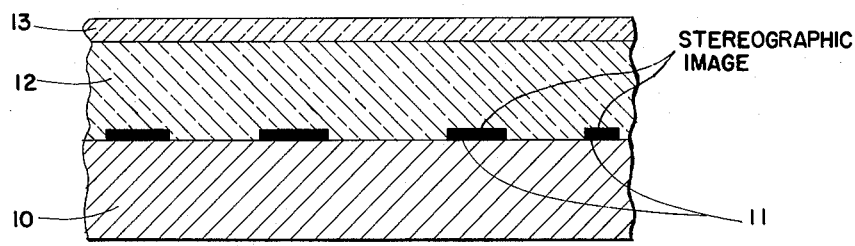
STAGE 1
LENTICULATION
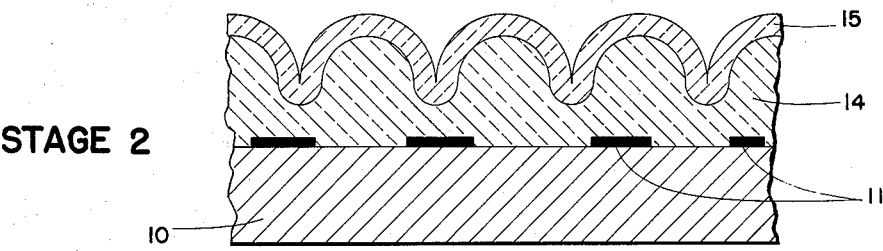
STAGE 2
JAMES W. HENRY
*INVENTOR.*
BY
ATTORNEY & AGENT 3,250,173
ABRASION RESISTENT LENTICULAR ELEMENT INTEGRAL WITH AN IMAGE ON A PAPER BASE
James W. Henry, Kingsport, Tenn., assignor to Eastman Kodak Company, Rochester, N.Y., a corporation of New Jersey
Filed Oct. 23, 1962, Ser. No. 232,439
2 Claims. (Cl. 88—1)

This invention relates to photographic elements provided with abrasion-resistent layers and more particularly to photographic images, including stereographic images, provided with abrasion-resistent layers.

Well known stereographic processes involve viewing a stereographic image adapted to produce a three-dimensional impression, through a screen superimposed on the image and composed of a series of fine lenses or lenticulations. Such processes have been called stereographic or autostereographic processes.

A stereographic process is described in U.S. Patent 2,297,846, granted October 6, 1942, wherein a thermoplastic sheet is placed upon a suitable stereographic image and is lenticulated by pressing the assembly into contact with a heated lenticulating roll. Another method for carrying out this process involves the extrusion of a melted synthetic polymer composition onto the surface of a layer of the picture followed by impressing a lenticulated pattern onto the surface of the polymer layer. The Brunson et al. U.S. patent application Serial No. 102,663, filed April 13, 1961, now abandoned, describes such a process wherein propylene polymers are applied to the surface of a picture and lenticules are impressed onto the polymeric surface. The resultant lenticulated pictures are clear and produce a strong three-dimensional effect. However, since the lenticulated surface is more susceptible to abrasion than is desirable, clarity of the picture and the three-dimensional effect is soon adversely affected. When the propylene polymers are replaced by more durable polymers, difficulties arise in forming a uniform lenticular pattern on the polymer surface, for example, due to cracking of the lenticules. When an attempt is made to protect the lenticular surface against abrasion by merely coating a protective layer over the lenticules from solvent composition, the lens-like formation of the lenticules is distorted, which adversely affects the three-dimensional impression.

According to the present invention an element carrying an image such as a photographic or photomechanical print on a base such as paper, and especially stereographic images, is provided with a polymer layer which is thermoplastic. On this layer is applied a thin abrasion-resistent layer of a polymer having better wearing properties than the first polymer layer having a thermoplastic flow point substantially higher than that of the first polymer layer. As a result the image is protected against abrasion and if the polymeric layer is hydrophobic, the image is also protected against moisture. Furthermore, an economy can be effected since the first polymer layer can be composed of a less costly or more easily handled polymeric material than the polymer of the second layer.

When the image over which the two polymeric layers are applied is the mentioned stereographic image, the first layer applied thereto is composed of a thermoplastic polymer such as polyethylene and has a thickness sufficient to allow molding therein of the lenticules required for the particular lenticular system in use. The second thin layer of polymer applied to the first polymer layer has a substantially higher flow point to facilitate the lenticulation of the polymeric surface and may have a thickness of the order of $\frac{1}{10}$ the thickness of the first polymer layer. Thus, for best results, the combined thickness of the two polymer layers should be such that the lens surface of the lenticules is spaced at least their focal length from the underlying image surface. In lenticulating the element, a lenticular patterned die is pressed against the polymeric surface with sufficient pressure, and if necessary heat, to form a lenticular pattern on the polymeric surface composed of lens-like elements uniformly distributed over the surface of the stereographic image. There may be as many as 100–200 cylindrical-shaped lenticules per inch distributed across the surface. The result is that a composite pattern of lenticulations of the character indicated in Stage 2 of the drawing is impressed into the two polymeric strata such that the outer polymer layer, insofar as any molding is concerned, tends to be unaltered in cross section, i.e., this layer appears to be drawn or folded into the lenticular shape rather than being molded. Photomicrographs of the cross section of the element show, particularly in the case of use of a polyester film on the outer surface, that the cross section of the outer polymer strata is substantially unaltered and is sharply folded at the intersection of adjacent lenticules. This result is not readily obtainable by lenticulating a single layer of polymer adhered to the surface of the image. Accordingly, the abrasion-resistent element of the invention includes an image carrying base or support composed, for example, of fibrous material such as paper, cloth, wood and the like, and superimposed thereon the polymeric abrasion-resistent layer separated from the image surface by at least one polymeric layer which is more thermoplastic than the abrasion-resistent layer. Thus, one or more thermoplastic polymer layers may be used to effect adherence of the abrasion-resistent polymeric layer to the image surface.

The accompanying drawing illustrates the elements and processes used in adapting the invention to forming lenticulated stereographic images provided with an abrasion-resistent surface.

In the drawing, in Stage 1, is shown diagrammatically in greatly enlarged cross-sectional view, the appearance of an element of the invention particularly adapted to lenticulation for the preparation of stereographic pictures. In the drawing layer 10 represents a base such as paper carrying a stereographic image 11, layer 12 represents a transparent layer of thermoplastic polymer such as a polypropylene wax layer and layer 13 represents a thermoplastic transparent polymeric abrasion-resistent layer such as a layer of a polyester. After lenticulation the element of Stage 1 appears essentially as shown in Stage 2, the lenticulated layer 14 being provided with an abrasion-resistent layer 15 conforming substantially to the contour of layer 14.

Other suitable image-carrying bases are those not deleterious to the process, e.g., opaque or transparent bases not unduly deformed during the step of lenticulating the polymeric surface; including glass and metal sheeting, cellulose ester sheeting such as white opaque cellulose acetate, acetate propionate or acetate butyrate sheeting; other synthetic polymeric bases such as polystyrene, poly(methyl methacrylate), poly(vinyl chloride), polyacrylonitrile, polyamides such as 6–6 nylon, 6–10 nylon, 6-nylon and polyesters such as poly(ethylene terephthalate) and polyesters of U.S. Patent 2,901,466 described in more detail hereinafter. Accordingly, in the element in Stage 1 of the drawing, the base 10 may be composed of one of the synthetic polymer bases just mentioned, e.g., a polyester, layer 12 may be an ethylene or propylene polymer mentioned above, and layer 13 may be a layer more abrasion-resistent than layer 12 such as a polyamide or polyester. Layers 10 and 13 may therefore have similar or identical properties, e.g., both 1( and 13 may be composed of a polyester or a polyamide.

According to a further embodiment of the invention, and a broad aspect thereof, the base 10 of Stage 1 of the drawing may be dispensed with and the image, such as the stereographic image, may be applied to the surface of layer 12 either prior to or subsequent to forming the lenticulations in layers 12 and 13. Thus, a two-layer element may be prepared by coating or extruding an ethylene or propylene polymer layer 12 and coating, extruding or laminating a thermoplastic and abrasion-resistant layer 13, e.g., a polyester layer, to the surface of layer 12. Thereafter, the two-layer element can be lenticulated to provide a two-layer lenticular screen. Then a stereographic image is applied to the surface of layer 12 opposite to the lenticulated surface, by printing an image thereon or by laminating a base such as paper carrying the image to the surface of layer 12. Otherwise, the image may be applied to the two-layer element composed of layers 12 and 13, by printing, or laminating a sheet carrying the image to the surface of layer 12, followed by lenticulating the assembly to obtain a stereographic element composed of the image affixed to the rear surface of lenticulated layers 12 and 13. Therefore, the invention contemplates, in part, the mentioned two-layer elements composed of polymeric strata of different thermoplastic and abrasion-resistant properties, and this two-layer element provided with an image, at the surface opposite the abrasion-resistant layer, prior or subsequent to lenticulation of the two layers.

As mentioned above, the polymers of layer 12 applied to the image surface of layer 10 are thermoplastic polymers which are readily molded upon application of heat and pressure. The preferred polymers are ethylene or propylene polymers within a molecular weight range of from about 1,000 to 500,000 (determined by the Staudinger method). These polymers respond satisfactorily to molding at temperatures of from about 100 to 300° F. during the lenticulation process of the invention and include crystalline or amorphous ethylene and propylene homopolymers; ethylene-propylene copolymers containing, e.g., about 2–10% ethylene; butene-propylene copolymers containing, e.g., about 10–20% butene; hexene-propylene copolymers containing, e.g., about 15% hexene; octene-propylene copolymers containing, e.g., about 5% octene; mixtures of such polymers, e.g., polyethylene-polypropylene mixtures and polybutene-polypropylene mixtures containing, e.g., 5–50% polybutene. Polypropylenes of molecular weight of the order of 50,000 to 500,000 prepared by well-known methods are useful. Polypropylene waxes having molecular weights of about 1,000–8,000 are especially useful and are prepared, for example, by heating polypropylenes of molecular weights above about 20,000 by the method described in the Guillet U.S. Patent 2,835,659, granted May 20, 1958. A suitable propylene-butene-1 copolymer may be obtained by copolymerizing propylene with butene-1 using any of the ionic catalysts used for the preparation of solid polymers of propylene such as catalyst complexes of metal halides with metal alkyls, etc. The molecular weight of the copolymer may be 20,000–50,000 having an inherent viscosity in tetralin at 145° C. exceeding 1.0 deciliter per gram (at a concentration of 0.25 g. per ml.). These polymers may be thermally degraded at temperatures of 250 to 450° C. in the substantial absence of oxygen to give wax-like solid products with a molecular weight range from 1,000 to 20,000 and densities of 0.88–0.93. The relative proportions of the monomers may range from about 30–70% butene-1 to 70–30% propylene. The process is described in U.S. patent application Ser. No. 954, filed January 7, 1961 in the names of Guillet and Coover. Suitable polyethylenes and polypropylenes having molecular weights of from about 50,000 to 500,000 are prepared by the Ziegler method as described in Belgian Patent 538,782.

These polymers are preferably applied to the printed paper or similar fibrous surface, or other base abovementioned, from hot melts by known extrusion methods at temperatures of the order of 300–500° F., although higher or lower temperatures can be used. Other coating methods may be employed and if desired the polymers may be laminated to the paper surface by using heat and pressure as described in the examples below.

The polymers which are then applied to the surface of the ethylene or proylene polymer layers or other thermoplastic layer 12, are organic polymers which are more resistant to abrasion, and particularly are polymers having a substantially higher melting or thermoplastic flow point than the ethylene and propylene polymers in order to adapt the element particularly to lenticulation for making stereographic images. Thus, the polymers should have thermoplastic flow points above about 300° F., although if a polyethylene or polypropylene wax having a fairly low flow point of about 100–150° is being used for the first layer, the polymer of the other layer can have a flow point as low as 200–300° F. As a result, the thin outer stratum of the element composed of the higher melting polymer is not adversely affected during the lenticulation process and provides a uniform protective layer over the lenticules of the underlying ethylene or propylene polymer.

Useful polymers for this outer stratum 13 of the element include polyamides, acrylic polymers, such as polyacrylonitrile, polystyrenes such as isotactic polystyrene, blended if desired with other polymers such as styrene-butadiene and butadiene-acrylonitrile copolymers; polymerized $\alpha$-methylstyrene, p-methylstyrene, $\alpha$-chlorostyrene, p-ethylstyrene, etc. Cellulose organic acid esters such as cellulose acetate having a higher thermoplastic flow point than the ethylene and propylene polymers, are also useful. The preferred polymers for use as the surface layer 13 of the element are homopolyesters, copolyesters and mixed homopolyesters and copolyesters including poly(ethylene terephthalates) and especially polyesters prepared as described in U.S. Patent 2,901,466 by reaction of dimethylterephthalate with 1,4-cyclohexane-dimethanol. A very useful copolyester is obtained by reacting 0.83 mole dimethyl terephthalate, 0.17 mole dimethyl isophthalate and at least 1.0 mole 1,4-cyclohexanedimethanol.

Aside from having good abrasion-resistant properties, the polyester films exhibit good clearness approaching the clarity of the polyester fiber for optimum performance of the optical lenticules. In addition, they are capable of bending without cracking to fit the sharp intersections between the adjacent cylindrical lenticules. This property allows the polyester to form a complete unbroken film of wearing surface over the lenticule so that the hard-wearing surface provides better protection against abrasion due to dust or mechanical abuse. In addition, during the lenticulation process the polyesters tend to conform more exactly to the contours of the lenticulating die and have the ability to be heat set after forming so that the stresses, which tend to cause the material to remember its original form, are effectively removed.

As in the case of the first polymeric layer 12, the outer abrasion-resistant polymer layer 13 may be applied by solvent coating methods, by extrusion from a hot melt or by lamination of a preformed sheet or film of the polymer to the polymer coated surface of the printed element. In preferred embodiments of the invention illustrated by the examples below, a thermoplastic layer of, for example, polyethylene or polypropylene is applied to the printed surface either by extrusion from a hot melt or by lamination of sheet to the surface using heat and pressure in a hot roll-type laminating machine. A thin abrasion-resistant layer of, for example, a polyester is then laminated to the first polymer layer using heat and pressure in the laminating machine. Thus, the two polymeric sheets can be laminated to the printed surface in a single pass through the laminating machine.

When adapting the invention to the production of stereographic pictures provided with an abrasion-resistant lenticulated surface, the base such as paper is provided with a vertically lined stereographic image, black-and-white or in color, such as obtainable by photomechanical printing method using a camera designed for movement around the subject when recording the stereographic image. The printed stereographic image is then supplied with the mentioned polymer layers which are embossed with the lenticular pattern by placing the element in proper alignment under a lenticular patterned die in a hydraulic press or by passing the element between pressure rolls, the roll in contact with the polymeric surface being embossed with the lenticular pattern. If desired the steam release embossing methods of the Brunson et al., U.S. Patent application Serial No. 75,400, filed December 12, 1960, may be used for this purpose.

In forming the lenticular pattern on the surface of the polymer layers pressures of the order of 750 to 2200 p.s.i. at temperatures of from about 100–300° C. can be used depending upon the relative plastic flow properties of the polymer layers. The temperature is preferably below the plastic flow temperature of the polymer comprising the outer stratum of the element. Thus, when a polyethylene layer is adhered to the picture surface and a polyester layer is applied thereto during the lenticulation step, a lower pressure such as 750 p.s.i. may be initially applied at about 100° C. for a time sufficient for the polyethylene layer to flow. The pressure is then raised to about 2100 p.s.i. and may be followed by cooling the lenticular patterned die to cause the lenticules to set. Thus very useful results are obtained when employing polyethylene or polypropylene polymers for the intermediate polymer layer in combination with an outer layer of a polyester by lenticulating the layers at temperatures of from about 100–300° C.

The following examples will serve to illustrate the invention.

*Example 1*

A paper base, carrying a multicolor stereographic image obtained by use of the mentioned special camera moving around the subject during exposure, is coated with a 0.010 in. thick layer of a polypropylene wax having a melting or thermoplastic flow point of about 200° F., by extrusion from a melt at a temeperature of about 300° F. A 0.0005 in. thick film of the above-mentioned copolyester of dimethylterephthalate, dimethylisophthalate and 1,4-cyclohexanedimethanol is then laminated on the surface of the layer of polypropylene wax by passing the sandwich through a heated roll-type of laminating machine. The resultant element is then placed under a lenticular patterned die in a hydraulic press at about 100° C. and 750° p.s.i. and the pressure then raised to 2100° p.s.i., to impress a lenticular pattern into the polymer surface of the element. The resultant lenticular screen on the image is clear and the picture gives a three-dimensional impression to a high degree. Also the lenticulated surface of the picture is more resistant to abrasion than a comparable element carrying only a lenticulated polypropylene surface.

*Example 2*

A 0.0010 in. thick sheet of polyethylene is laminated onto the surface of a multicolored stereographic image on a paper base by passing the sandwich through a heated roll-type laminating machine and during the same pass through the machine a 0.0005 in. thick sheet of the copolyester film of Example 1 is laminated to the surface of the polyethylene film. Impression of a lenticular pattern into the polymeric surface of the element by use of a lenticular patterned die as described in Example 1 yields a clear lenticular image having good abrasion resistance and exhibiting a good three-dimensional impression.

In a similar manner, the other mentioned ethylene and propylene polymers are adhered by coating, extrusion or lamination methods to a layer of the higher melting polymer such as a polyester, acrylic, cellulose ester or styrene polymer followed by lenticulation of the polymer surface.

The invention has been described in considerable detail with particular reference to certain preferred embodiments thereof, but it will be understood that variations and modifications can be effected within the spirit and scope of the invention as described hereinabove, and as defined in the appended claims.

What I claim is:

1. A paper base having a stereographic image on one surface, a layer of polyethylene upon the image surface and adhered thereto, and a thin layer of a polyester of dimethylterephthalate and 1,4-cyclohexanedimethanol upon said layer of polyethylene and adhered thereto, and said layers being lenticulated.

2. A paper base having a stereographic image on one surface, a layer of polypropylene upon the image surface and adhered thereto, and a thin layer of a polyester of dimethylterephthalate and 1,4-cyclohexanedimethanol upon said layer of polypropylene and adhered thereto, and said layers being lenticulated.

References Cited by the Examiner

UNITED STATES PATENTS

| | | | |
|---|---|---|---|
| 1,817,963 | 8/1931 | Capstaff | 88—1 |
| 1,989,553 | 1/1935 | Kanolt | 88—1 |
| 2,151,301 | 3/1939 | Percy et al. | 88—29 |
| 2,279,825 | 4/1942 | Kaszab | 88—1 |
| 2,404,073 | 7/1946 | Karfiol et al. | 156—209 |
| 2,733,180 | 1/1956 | Pinto | 156—209 |
| 2,901,466 | 8/1959 | Kibler et al. | 260—75 |
| 2,927,047 | 3/1960 | Schulde | 88—1 |
| 2,947,415 | 8/1960 | Garth. | |
| 3,148,059 | 9/1964 | Brunson | 88—1 |

JEWELL H. PEDERSEN, *Primary Examiner.*

D. J. HOFFMAN, O. B. CHEW, *Assistant Examiners.*